June 29, 1926. 1,590,860
W. L. SCRIBNER
DIFFERENTIATING MINE CAR AXLE
Filed April 1, 1926
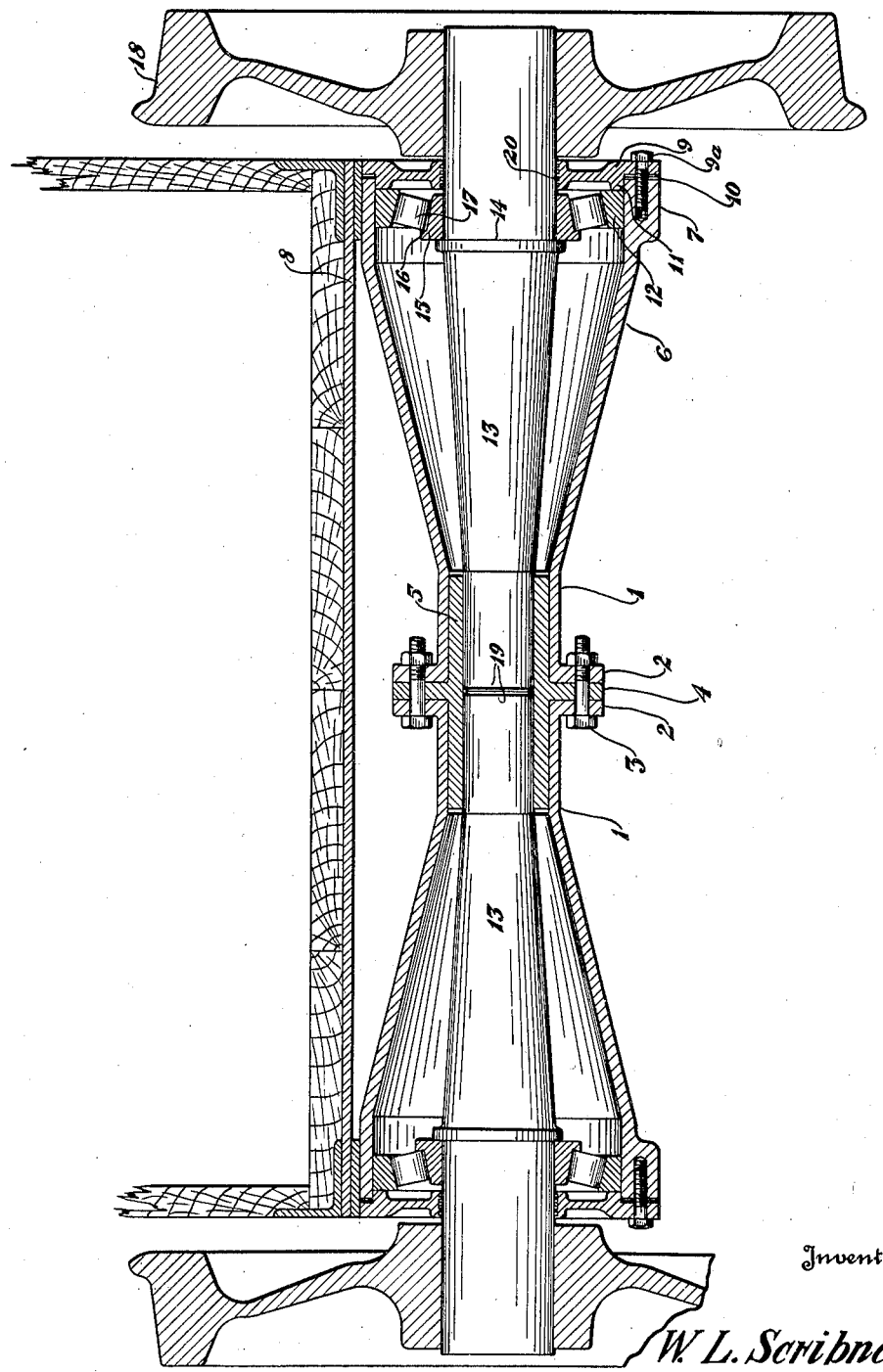
Inventor
W. L. Scribner
By Frease and Bird
Attorney Patented June 29, 1926.

1,590,860

UNITED STATES PATENT OFFICE.

WILLIAM L. SCRIBNER, OF CANTON, OHIO, ASSIGNOR TO THE TIMKEN ROLLER BEARING COMPANY, OF CANTON, OHIO, A CORPORATION OF OHIO.

DIFFERENTIATING MINE-CAR AXLE.

Application filed April 1, 1926. Serial No. 99,059.

The invention relates to roller bearing axles, especially adapted for use upon mine cars and the like, and more particularly to a differentiating axle which permits the wheels to travel at different speeds, as when passing around a curve.

It is common practice in the construction of mine cars and the like to fix a wheel upon each end portion of an axle but such an arrangement does not permit of a differential speed in the travel of the wheels as the car passes around a curve, causing one wheel or the other to skid or slide upon the track.

To overcome this objection, cars of this type have been constructed in which each wheel is rotatably mounted upon the axle but such a construction requires the use of two roller bearings for each wheel and requires the removal of the bearings with the wheels, increasing the cost of the car and complicating the construction thereof.

In my copending application, Serial No. 76,622, filed December 21, 1925, I disclose a differentiating axle in which only one roller bearing is used for each wheel, the axle being formed of two aligned, independently rotatable sections, to each of which one wheel is fixed; the adjacent ends of the axle sections being journaled in a central bearing sleeve welded or otherwise permanently attached to the inner end portions of the axle housing sections.

The object of the present improvement is to provide a differentiating axle which will overcome the objections above referred to and which is an improvement upon the axle disclosed in my copending application above mentioned; only one roller bearing being required for each wheel, the axle being formed in two aligned, independently rotatable sections, to which the wheels are fixed, a single roller bearing being provided in the axle housing for each axle section, the inner ends of the axle housings being flanged and connected to a central annular flange upon a bearing sleeve within which the inner ends of the axle sections are journaled.

An embodiment of the invention is illustrated in the accompanying drawing, in which:—

The figure is a longitudinal sectional view of an axle constructed in accordance with the invention.

Similar numerals refer to similar parts throughout the drawing.

The axle housing comprises two tubular sections 1, the adjacent ends of which are provided with the peripheral flanges 2 arranged to be connected, as by the bolts 3, to the central peripheral flange 4 provided upon the bearing sleeve 5 arranged to extend a substantial distance into the inner end of each axle housing section.

Each section of the axle housing is flared outward at 6 and terminates in a cylindric flange 7 arranged to be connected to the bottom or floor plates 8, of the car, in any suitable manner.

A ring 9 is connected, in any suitable manner, as by the bolts 9ª, to the end of the cylindric flange portion 7 of each axle housing section, shim plates 10 being provided to properly space the same. This ring is provided with an annular flange 11 snugly fitting within the flange 7 for contact with the outer end of the cup 12 of a taper roller bearing.

The axle is formed of two aligned, independently rotatable sections 13, each of which is provided with an annular shoulder 14 located within the enlarged outer end portion of the accompanying housing section and contacting with the inner end of the cone 15 of said taper roller bearing, this cone being provided at its inner end with an annular shoulder 16 for engagement with the adjacent ends of the taper rollers 17. Each car wheel 18 is fixed, in any suitable manner, upon the outer end portion of the adjacent axle section.

The inner ends of the axle sections, as shown at 19, are hardened and ground, and journaled within the bearing sleeve 5. The interior of the axle housing is preferably filled with grease, and to prevent the same from leaking around the wheel hub washers 20 of leather or the like, may be carried by the rings 9 in any suitable manner and arranged to contact with the axle sections.

Each wheel is thus fixed upon one independently rotatable section of the axle, the axle sections being journaled, by means of the taper roller bearings and the sleeve 5, within the axle housing.

Thus a differentiating axle is provided in which only one roller bearing is required for each wheel, the entire thrust and radial load being taken by the roller bearings, requiring no thrust washers or the like.

This enclosed axle construction affords a large grease reservoir permitting the same to be run for a considerable length of time without renewing the grease supply; and as there is no wear on the axle the same may be made of low carbon steel, thereby reducing the cost of the structure.

The roller bearings may be adjusted to take up wear by tightening the adjusting bolts in the rings, drawing these rings against the cups of the outer bearings, the proper thickness of shim plates being of course placed in position between the rings and the ends of the axle housing.

I claim:—

1. A differentiating axle including a housing formed of a pair of tubular sections having peripheral flanges at their inner ends, a central journal bearing located within the inner ends of said housing sections and provided with a central peripheral flange connected to the flanges upon the housing sections, a pair of aligned axle sections within the housing having their inner ends abutting and journaled in said journal bearing, the outer end portion of each axle section being shouldered, a roller bearing cone upon each shouldered portion, a roller bearing cup mounted in each outer end portion of the housing, taper rollers between each cooperating cone and cup, and a wheel fixed upon the outer end portion of each axle section.

2. A differentiating axle including a tubular housing, a central journal bearing located within the housing, a pair of aligned axle sections within the housing having their inner ends abutting and journaled in said journal bearing, the outer end portion of each axle section being shouldered, a roller bearing cone upon each shouldered portion, a roller bearing cup mounted in each outer portion of the housing, taper rollers between each cooperating cone and cup, a wheel fixed upon the outer end portion of each axle section, a ring in each outer end portion of the housing contacting with the adjacent roller bearing cup and means for adjusting the ring within the housing.

In testimony that I claim the above, I have hereunto subscribed my name.

WILLIAM L. SCRIBNER.